Aug. 23, 1955     D. A. MACK     2,716,194
PULSE GENERATOR
Filed Sept. 2, 1953
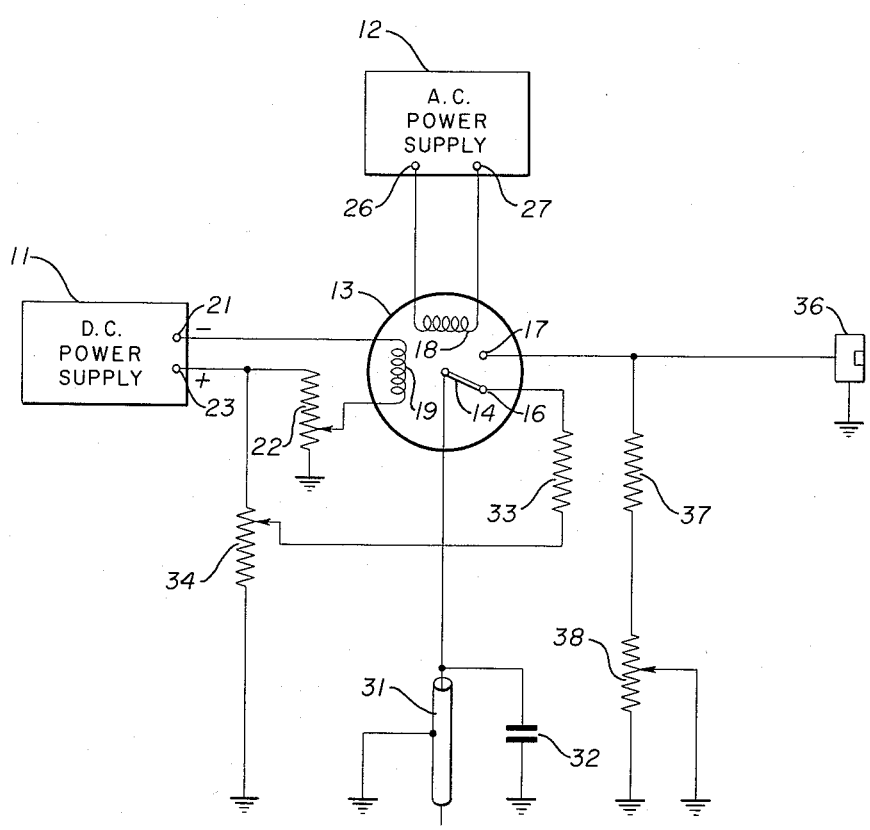
INVENTOR.
DICK A. MACK
BY *Roland A. Anderson*
ATTORNEY.

United States Patent Office 2,716,194
Patented Aug. 23, 1955

2,716,194

PULSE GENERATOR

Dick A. Mack, Berkeley, Calif., assignor to the United States of America as represented by the United States Atomic Energy Commission Application September 2, 1953, Serial No. 382,502

4 Claims. (Cl. 307—108)

The present invention relates to pulse generators and more particularly to a square wave pulse generator, the output of which has an extremely fast rise time.

With the increasing use of transmission lines in pulse systems where the pulses have fast rise times, it has become desirable to be able to test the response of such lines prior to installation. Such testing of coaxial cable transmission lines only becomes practical under certain conditions. First, it becomes necessary to realize that coaxial lines and points of mechanical discontinuity within coaxial cables can be represented as networks with distributed impedance elements. Then, such conditions become: (1) the mechanical distance to be measured should not exceed the electrical length of the square wave, and (2) the highest frequency to be measured should not exceed approximately one-third of the inverse-rise-time of the pulse.

It has been found that suitable results of testing coaxial cables is possible where the test pulse has a duration of substantially 0.1 microsecond and a rise time of $1 \times 10^{-9}$ second. It has also been found that a pulse generator using vacuum tube and gaseous discharge tube elements were generally complex and unreliable, the latter being due to the changing circuit characteristics during use. To overcome such disadvantages and still meet the specifications of the pulse, as set out above, the present invention, in general, comprises a power supply, a section of charging cable, and a conventional mercury relay.

It is therefore an object of the present invention to provide a new and improved square wave pulse generator.

Another object of the invention is to provide a pulse generator which develops pulses having a rise time of substantially $1 \times 10^{-9}$ second.

Still another object of the invention is to provide a pulse generator utilizing conventional electrical components with a mercury relay as a switch.

A further object of the invention is to provide a simple, rugged, and reliable generator of square wave pulses.

Other objects and advantages of the invention will be apparent in the following description and claims considered together with the accompanying drawing which is a schematic wiring diagram of the invention.

Referring to the drawing in detail, there is provided a conventional D. C. power supply 11, a conventional A. C. power supply 12, and a conventional mercury relay 13. Such mercury relay 13 is of the type having two positions and for purposes of illustration is shown to have a contacting arm 14 pivotably mounted so that the free end makes contact with either an electrode 16 or a second electrode 17. Also provided within the relay 13 is an actuating coil 18 and a holding coil 19 so disposed with respect to the arm 14 that upon energization of the latter coil the arm is held in contact with the electrode 16 and upon energization of the former coil sufficiently to overcome the effect of the holding coil the arm is forced into contact with the second electrode 17.

The holding coil 19 is connected with one side directly tied to the ungrounded negative terminal 21 of the D. C. power supply 11 and the other side tied to the adjustable arm of a potentiometer 22 which is connected from the positive terminal 23 of the power supply to ground. Thus by adjusting the position of the arm of the potentiometer 22 the energization of the actuating coil 18 necessary to change the position of the relay arm 14 is determined. To energize the actuating coil 18 the sides thereof are respectively connected to output terminals 26 and 27 of the A. C. power supply 12. From the foregoing it will be readily apparent that by proper adjustment of the potentiometer 22 the relay arm 14 may be pivoted from contact with electrode 16 to contact with electrode 17 and back again once during each cycle of the A. C. power supply output.

The relay contacting arm 14 is connected at the pivot point to the center conductor of one end of a coaxial cable 31. Such section of coaxial cable 31 is open at the terminating end with the outer conductor connected to ground. To compensate for losses in circuits to be used with the present invention and to equalize end effect inductance, a capacitor 32 is connected from the center conductor of the cable 31 at the input end thereof to ground.

To charge the cable 31 while the relay arm 14 is contacting electrode 16 a charging resistor 33 is connected from such electrode to the adjustable arm of a potentiometer 34 which, in turn, is connected from the positive terminal 23 of the D. C. power supply 11 to ground. Thus the section of coaxial cable 31 becomes charged to substantially the voltage of the adjustable arm of the potentiometer 34 during at least a portion of each cycle of the output of the A. C. power supply 12.

The remaining connections of the circuit comprise a direct connection from the electrode 17 of the relay 13 to an output terminal 36 and a series circuit having a resistor 37 and potentiometer 38 connected from the electrode 17 to ground. The adjustable arm of the potentiometer 38 is directly connected to ground so that the resistance of the series circuit may be varied. Such adjustment is necessary so that the total resistance of the series circuit may be altered to approximate the characteristic impedance of the coaxial cable 31 and thereby prevent reflections during discharge of the cable.

It may be desirable under certain load conditions at the output terminal 36 to connect an inductor and resistor series-combination (not shown) between the terminal and load. Such combination of elements serves to isolate the load from the cable and thereby prevents a prolongation of the rise time of the output pulse.

In operation the holding coil 19 is continuously energized thereby establishing the normal position of the contacting arm 14 as that where the free end of the arm is contacting the electrode 16. With the contacting arm 14 in such normal position the coaxial cable 31 becomes charged in a manner consistent with the theory of transmission lines. As the output of the A. C. power supply 12 reaches a certain value in the cyclic variations where the effect of the actuating coil 18 overcomes the effect of the holding coil 19, the contacting arm 14 is moved into contact with the electrode 17. Under the latter circumstance the coaxial cable 31 is disconnected from the D. C. power supply and is connected to the output terminal 36. The coaxial cable 31 then discharges through the resistance embodied in the resistor 37 and potentiometer 38 in parallel with any external impedance connected to terminal 36, which is preferably established to be substantially the value of the characteristic impedance of the cable 31.

The foregoing action occurs instantaneously once during each cycle of the output voltage of the A. C. power supply 12 and the waveform of the output of the circuit at the terminal 36 has a very steep wavefront and a duration equal to twice the time constant of the coaxial cable 31. The wavefront of the output at the terminal 36 is inherently steep and the addition of the capacitor 32, resistor 37, and potentiometer 38 in the output circuit prevents circuits which follow from prolonging the time of the wavefront. At the termination of the discharge of the cable 31 and at the time the holding coil 19 regains control of the relay the contacting arm 14 returns to normal position against the electrode 16 to again charge the coaxial cable 31.

It has been found that, with the above connections, pulses having a duration of 0.1 microsecond with a rise time of the leading edge of less than one billisecond are generated. The A. C. power supply 12 may be readily replaced with another type circuit for sufficiently energizing the actuating coil 18 within the scope of the invention so as to provide other pulse repetition rates. Also, other lengths of coaxial cable 31 could be readily used, as well as operating several such cables in parallel to decrease the impedance of the output pulse.

While the salient features of the invention have been described in detail with respect to one embodiment it will be apparent that numerous modifications may be made within the spirit and scope of the invention and it is therefore not desired to limit the invention to the exact details shown except insofar as they may be defined in the following claims.

What is claimed is:

1. In a square wave pulse generator, the combination comprising a high speed relay having a first and second contact with a common connection, a section of transmission line connected at one end to said common connection, a circuit having a value of resistance substantially equal to the characteristic impedance of said line connected to one of said contacts, charging means connected to the other of said contacts, means for operating said relay to alternately connect said line to said charging means and to said circuit, and a capacitor connected to said transmission line to maintain the fast rise time of pulses formed across said characteristic impedance.

2. In a square wave pulse generator, the combination comprising a high speed relay having a first and second contact with a common connection, a section of open-ended coaxial cable having the central conductor connected at one end to said common connection and the outer conductor connected to ground, a capacitor connected across the input end of said cable, a source of charging voltage connected through a high value of resistance between said first contact and ground, a resistive circuit having a value substantially equal to the characteristic impedance of said cable connected between said second contact and ground, and means connected to said relay for alternately closing said first and second contacts.

3. In a square wave pulse generator, the combination comprising a high speed relay having a first and second contact with a common connection, said relay also having a holding coil and an actuating coil, a section of open-ended coaxial cable having the central conductor connected at one end to said common connection and the outer conductor connected to ground, a capacitor connected across the input end of said cable, a source of charging voltage connected through a high value of resistance between said first contact and ground, a resistive circuit having a value substantially equal to the characteristic impedance of said cable connected between said second contact and ground, means connected across said holding coil for maintaining a constant value of energization to close said first contact, means connected across said actuating coil for intermittently energizing such coil sufficient to overcome the effect of said holding coil to open said first contact and close said second contact, and an output terminal connected to said second contact.

4. In a square wave pulse generator, the combination comprising a high speed relay having a first and second contact with a pivotably mounted arm therebetween, a holding coil connected across a source of bias voltage to normally maintain said arm in position against said first contact, and an actuating coil connected across a source of alternating voltage for intermittently moving said arm to said second contact; a transmission line connected at one end to said arm; a source of charging voltage connected to said first contact; and a resistance equal to the characteristic impedance of said transmission line connected to said second contact.

References Cited in the file of this patent

UNITED STATES PATENTS

| | | |
|---|---|---|
| 2,294,863 | Hadfield | Sept. 1, 1942 |
| 2,465,407 | Varela | Mar. 29, 1949 |